(No Model.) 2 Sheets—Sheet 1.
N. C. MITCHELL.
CONVEYING DEVICE FOR RUBBER STOCK.
No. 418,042. Patented Dec. 24, 1889.
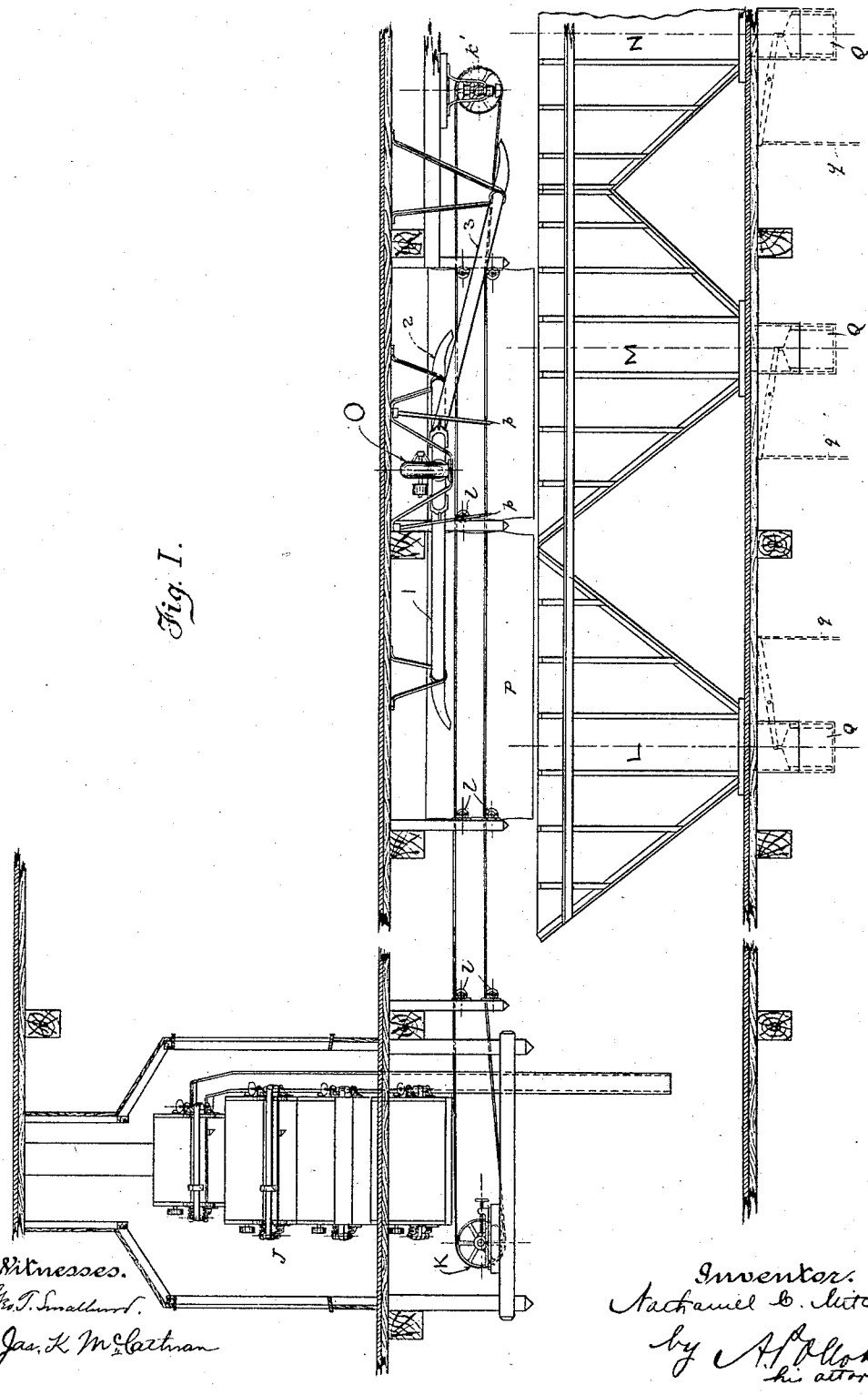
Fig. I.
Witnesses.
Geo. T. Smallwood.
Jas. K. McCathran
Inventor.
Nathaniel C. Mitchell
by A. P. Pollok
his attorney
N. PETERS, Photo-Lithographer, Washington, D. C.

(No Model.) 2 Sheets—Sheet 2.
N. C. MITCHELL.
CONVEYING DEVICE FOR RUBBER STOCK.
No. 418,042. Patented Dec. 24, 1889.
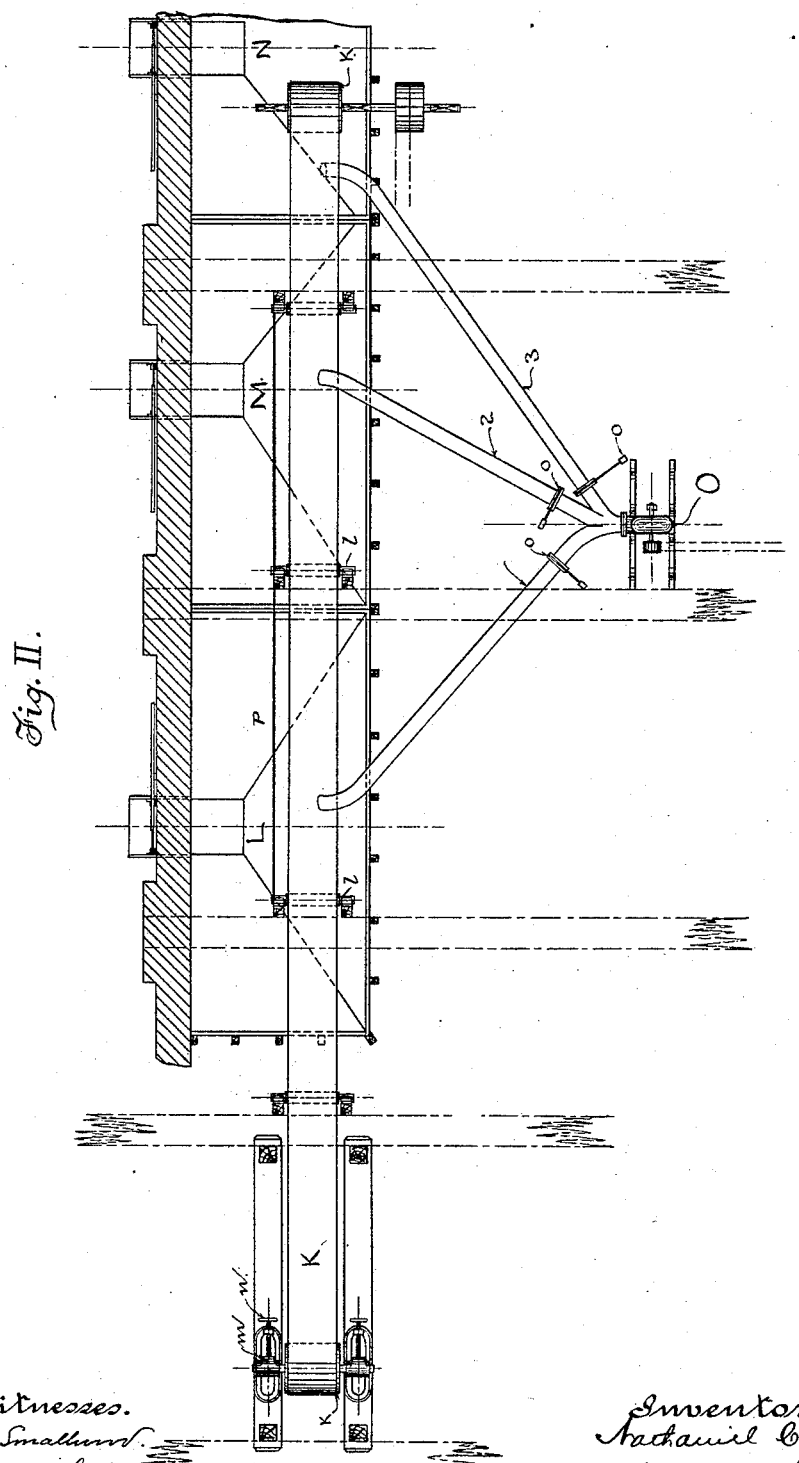

UNITED STATES PATENT OFFICE.

NATHANIEL C. MITCHELL, OF PHILADELPHIA, PENNSYLVANIA.

CONVEYING DEVICE FOR RUBBER STOCK.

SPECIFICATION forming part of Letters Patent No. 418,042, dated December 24, 1889.

Application filed September 20, 1889. Serial No. 324,580. (No model.)

*To all whom it may concern:*

Be it known that I, NATHANIEL CHAPMAN MITCHELL, of Philadelphia, in the county of Philadelphia and State of Pennsylvania, have invented a new and useful Improvement in Conveying Devices for Rubber Stock, which improvement is fully set forth in the following specification.

This invention has reference to apparatus for use in the treatment of old rubber goods to recover the rubber therefrom in a condition suitable for further use. It has reference more particularly to means for conveying the rubber stock and for discharging the same into any one of a series of receivers, from which it can be removed as desired for further treatment. The waste stock is reduced by cracker-rolls to small fragments, and then freed from all particles of iron and steel by means of apparatus described in other applications for patent. The rubber then is delivered by the separator onto an endless belt or band, by which it is fed forward continuously. The discharge end of this belt moves over a series of receiving vessels or reservoirs in which the rubber is to be deposited. The pulley over which the belt returns is placed just above the last of these reservoirs, so that all stock carried to this point will fall into it. The belt is provided with clearing or discharging devices, one over each receiver, except the last of the series, above which the belt discharges, if not already cleared of its load. Preferably the discharging devices are air-pipes leading from a small fan or blower to the upper side of the belt, their orifices being respectively opposite one of the receivers, and there being one air-pipe for each receiver, except the last. These air-pipes are provided with valves, by means of which a steady stream of air may be caused to play upon the belt, sweeping off the rubber scraps or fragments into the receiver below. In this way the receivers may be filled in turn. It is important to keep the belt free from dust, and for this purpose another branch pipe is led to the under side of the return portion of the belt.

In the accompanying drawings, which form part of this specification, Figure I is a side elevation, partly in section, of apparatus constructed in accordance with the invention; and Fig. II is a top view thereof.

At the left of Fig. I is shown a separator J, in which the rubber is treated to remove particles of iron and steel, and which may be of any suitable construction. As this separator forms no part of the present invention, it is not necessary here to describe it in detail. Beneath the outlet of this separator is the feed end of an endless belt or conveyer K, by which the rubber particles as they fall onto it are carried forward. This belt turns on pulleys $k$ $k'$, and is supported at suitable intervals by friction-rollers $l$. The shaft or pulley $k$ is journaled in adjustable bearings $m$, and set-screws $n$ are provided for tightening the belt when necessary. Beneath the belt K, near the discharge end thereof, are receivers or reservoirs L M N. Three are shown; but a greater or less number may be used, as occasion may require. The pulley $k'$ is directly over the last receiver N, so that all particles carried to the end of the belt will fall into it.

At O is placed a small fan or blower, which is kept in continuous action, and from it are led the air-pipes 1, 2, and 3. Pipe 1 has its discharge-orifice opposite receiver L and directly over belt K, while the orifice of pipe 2 is similarly arranged over receiver M. If it be desired to fill receiver L while the contents of M and N are being withdrawn, the valve $o$ of pipe 1 is open while valve of pipe 2 is closed, hand-levers $p$ being provided to operate these valves. Fan O then causes a steady current of air to play upon the belt K, carrying off all the particles of rubber into receiver L until sufficiently full. A vertical screen or curtain P is arranged alongside of the belt, and the particles striking against it are deflected into the receiver below. A third air-pipe 3 is conducted from the fan to the under side of the return portion of belt K, and its function is to keep the belt clear from particles of dust that may settle upon it.

The receivers L M N are provided with discharge-gates Q, operated by means of handles $q$, through which outlets they may be emptied as desired into a vessel or tank for treating the stock for removal of fibrous matters.

The apparatus herein described forms part of a system for the treatment of old rubber stock, and is used in practice for conveying the rubber particles as they fall from the magnetic separator to the acid bath; but it will be understood that it is not limited to such use, but may be employed in other parts of the same or a like system, or in other arts or industrial processes in which a like operation is to be performed.

Having now fully described my said invention and the best mode which I have contemplated of applying the principle thereof, what I claim, and desire to secure by Letters Patent, is—

1. The combination, with an endless feed-belt or conveyer, of a series of receivers arranged beneath the belt or conveyer, and a series of discharging devices or clearers adapted for independent operation and arranged to act upon the upper surface of the belt, whereby the stock carried by the belt may be deposited in any one of the receivers, substantially as described.

2. The combination, with an endless feed-belt or conveyer, of a series of receivers, the last being directly beneath the discharge end of the belt, and a clearer or discharge for each of the other receivers, arranged to act upon the upper surface of the belt, substantially as described.

3. The combination, with an endless feed-belt or conveyer, of a series of receivers, air-pipes having their orifices over said belt and respectively opposite said receivers, and a fan or blower for forcing a current of air through said pipes, substantially as described.

4. The combination, with an endless feed-belt or conveyer, of a series of receivers, the last being directly under the discharge end of said belt, an air-pipe for each of the other receivers, and a fan or air-forcing device, substantially as described.

5. The combination, with an endless feed-belt or conveyer, of a series of receivers, air-pipes for discharging a current of air upon said belt to blow off the particles carried by it, and a screen or curtain opposite the outlets of said pipes to deflect said particles into said receiver, substantially as described.

6. The combination, with an endless feed-belt or conveyer, of a series of receivers, air-discharge pipes for directing a current of air upon the surface of said belt, and another branch pipe for directing an air-current against the under side of the return portion of said belt, substantially as described.

In testimony whereof I have signed this specification in the presence of two subscribing witnesses.

NATHANIEL C. MITCHELL.

Witnesses:
PHILIP MAURO,
C. W. CROASDILL.